United States Patent [19]

Anthony et al.

[11] 4,399,173
[45] Aug. 16, 1983

[54] MULTILAYER FILMS COMPRISING LOW PRESSURE, LOW DENSITY POLYETHYLENE

[75] Inventors: John Anthony, Downers Grove, Ill.; Stuart J. Kurtz, Martinsville, N.J.

[73] Assignee: Union Carbide Corporation, Danbury, Conn.

[21] Appl. No.: 336,592

[22] Filed: Jan. 4, 1982

[51] Int. Cl.³ .................. B32B 27/08; B32B 27/32
[52] U.S. Cl. .................................. 428/35; 428/220; 428/516; 264/176 R
[58] Field of Search .................... 428/35, 516, 220

[56] References Cited

U.S. PATENT DOCUMENTS

| | | | |
|---|---|---|---|
| 3,843,478 | 10/1974 | Zuscik | 128/290 W |
| 4,147,827 | 4/1979 | Breidt, Jr. et al. | 428/218 |
| 4,160,053 | 7/1979 | Clayton | 428/35 |
| 4,194,039 | 3/1980 | Mueller | 428/213 |
| 4,346,834 | 8/1982 | Mazumdar | 428/516 X |

*Primary Examiner*—P. C. Ives
*Attorney, Agent, or Firm*—John C. Lefever; Real J. Grandmaison

[57] ABSTRACT

A multilayer plastic film free of melt fracture suitable for use in packaging and making bags wherein the film comprises a core layer of low melt index, low pressure, low density polyethylene, and two outer layers of a high melt index, low pressure, low density polyethylene. The process of making the multilayer film is also disclosed.

8 Claims, No Drawings

MULTILAYER FILMS COMPRISING LOW PRESSURE, LOW DENSITY POLYETHYLENE

This invention relates to a multilayer plastic film, and to a method of producing a multilayer plastic film suitable for packaging and making bags.

With the introduction of "linear" low density polyethylenes made by the low pressure processes (hereinafter referred to as "LPLDPE"), attempts have been made to substitute this material for film applications in place of conventional highly branched low density polyethylenes made by high pressure processes (hereinafter referred to as "HPLDPE"). The reason for these efforts is that LPLDPE is widely recognized as being tougher and stronger than HPLDPE.

Generally, more than fifty percent of all low density polyethylene is processed into plastic film. This film is primarily utilized in packaging applications such as for meat, produce, frozen food, baked goods, ice bags, boilable pouches, textile and paper products, rack merchandise, industrial liners, shipping sacks, pallet stretch and shrink wrap. Large quantities of wide heavy gauge film are used in construction and agriculture. Further, plastic garbage and trash bags for bulk waste material may be produced in film form from various polymers such as polyethylene. The films used for such bags should desirably possess high strength characteristics such as puncture toughness, tensile strength and Elmendorf tear strength. Another desirable property of plastic bags is low manufacturing cost. It will be recognized that the required quantity of raw material may be reduced by use of polyethylene film having the previously mentioned high strength characteristics, and in part for this reason, multiple layer plastic films have been used to manufacture garbage bags.

Polyethylene film for the production of consumer garbage and trash bags is generally prepared in the thickness range of between about 1.5 mils and about 3.0 mils. As earlier indicated, it is customary for low density polyethylene, produced by the standard high pressure process, to be used as the basic polymer or raw material for this product because of its relatively low cost, good physical properties, ease of extrusion at high rates, good heat seal strength, and ability to be readily converted into the finished product.

There is, however, a continuous need for stronger films for this application which will be even more resistant to damage by puncture tearing, or yielding under stress. A stronger film is not only desirable from the standpoint that the finished bag is more serviceable in the end-use, but also in that a thinner film can be used and still meet the necessary strength requirements, thus providing a better cost-performance relationship for the consumer.

However, in the process of melt-extruding thermoplastics, particularly polyolefins such as polyethylenes, a phenomenon known as melt fracture may be encountered. Melt fracture is generally detected as the resin melt leaves the die and is observed as a surface roughness which detracts from the gloss and appearance of the extrudate. In extreme situations, the surface roughness can also adversely affect the physical properties of the film.

The problem of melt fracture generally arises when extrusion is conducted at lower melt temperatures, higher melt viscosities, using linear polymers of narrow molecular weight distribution, employing narrow die gaps, and is especially aggravated at increased throughput rates. As a result, the extrusion of low pressure, low density polyethylene which exhibits higher melt viscosities than high pressure, low density polyethylene, results in the occurrence of melt fracture. In addition, the extrusion of low pressure, low density polyethylene which exhibits higher melt viscosities than high pressure, low density polyethylene having an equivalent melt index results in melt fracture events at lower output rates, wider die gaps, and higher melt temperatures. Likewise, the extrusion of low pressure, low density polyethylene having a low melt index even further aggravates the melt fracture problem at high output rates and narrow die gaps. The frequency of melt fracture events is most pronounced at the lower extrusion temperatures normally associated with blown film extrusion. On the other hand, too high a melt temperature results in bubble instability and cooling difficulties by conventional extrudate air cooling procedures. In addition, an increased die lip opening can offer relief from melt fracture, but can result in poor gauge control, bubble instability due to too great a draw-down from die lip gap to finished film thickness, and an imbalance in directional film properties as associated with the machine direction and transverse direction of the film. Therefore, a need exists for reducing or eliminating the melt fracture problem encountered during the extrusion of low melt index, low pressure, low density polyethylene.

Accordingly, it is an object of this invention to provide a method for reducing or eliminating melt fracture events during the extrusion of low melt index, low pressure, low density polyethylene.

It is another object of this invention to provide a method for preventing the deterioration of the physical properties of low melt index, low pressure, low density polyethylene caused by melt fracture.

It is yet another object of this invention to provide a method of producing a multilayer polyethylene film enabling reduced extruder melt pressure and power requirements.

It is still another object of this invention to provide a multilayer polyethylene film possessing improved puncture toughness, tensile strength, yield strength and tear strength over conventional multilayer polyethylene films.

These objects, and others, will be apparent from a reading of the following description of the invention and the appended claims.

In accordance with the present invention, there is provided a method of producing a multilayer polyethylene film which comprises coextruding a core layer of low melt index, low pressure, low density polyethylene between two outer layers of a high melt index, low pressure, low density polyethylene. More particularly, the core layer of low pressure, low density polyethylene has a melt index in the range of between about 0.2 decigrams per minute and about 3.0 decigrams per minute. The outer layers of low pressure, low density polyethylene have a melt index in the range of between about 5.0 decigrams per minute and about 20.0 decigrams per minute.

Thus, pursuant to the present invention, melt fracture of low melt index, low pressure, low density polyethylene during extrusion may be substantially eliminated by simultaneous extrusion thereof between first and second outer layers of high melt index, low pressure, low density polyethylene. Such provides all of the benefits normally associated with lower melt temperature extrusion, using smaller die lip openings, increased melt viscosities, and high throughput rates. The melt fracture problem and its associated lowering of physical properties as well as the appearance defect can be substantially eliminated by the practice of this invention. In addition, high extruder back pressure and power requirements are minimized by the present method.

In the preferred practice of the invention, coextruded multilayer blown low pressure, low density polyethylene film is produced at high output rates through a narrow tubular die lip gap. The melt index of the core layer comprising low pressure, low density polyethylene is about 3.0 decigrams per minute or less, and preferably between about 0.2 and about 2.0 decigrams per minute. The melt index of the low pressure, low density polyethylene forming the outer layers of the multilayer film is greater than about 3.0 decigrams per minute, and preferably between about 5.0 and about 20.0 decigrams per minute. Generally, the polyethylene resins which are chosen for the outer layers are those which have as low a melt index as possible without incurring melt fracture events at the desired output rates, die lip gap, and process temperatures. Typical satisfactory process parameters include die lip gaps of up to about 50 mils, and preferably between about 20 mils and about 40 mils, and melt temperatures of between about 350° F. and about 475° F.

The multilayer film composition of this invention may have any suitable thickness. Typically, it may be as thick or as thin as commercially practical. For use as garbage or trash bags, the multilayer film preferably has a thickness of between about 1 mil and about 3 mils. Substantially thinner films would usually not be suitable because the strength properties of the film would be unacceptably low for use as a trash or garbage bag. Films substantially thicker than 3 mils are not preferred since the additional strength associated with thicker material is ordinarily not required for trash-garbage bag usage. A further disadvantage of thicker films would be difficulty in handling and tying the bag open end. A preferred balance of these opposing considerations is a film between about 1.3 and 1.8 mils thick. For use as a film wrap, the multilayer film may have a thickness of between about 0.4 mil and about 0.8 mil.

The multilayer film of this invention may be employed for general packaging uses, for example, garment bags having a film thickness of between about 0.5 and about 0.7 mil; and industrial shipping bags having a film thickness of between about 6 and about 10 mils. In general, the present multilayer film may be employed for practically any packaging application.

The multilayer film herein may have any suitable ratio of thicknesses between the core layer and the outer layers. A satisfactory ratio of thicknesses between the core layer and the two outer layers is on the order of about 1:5:1 for the first outer layer, core layer, and second outer layer, respectively. However, even lower outer layer thickness ratios are acceptable provided the processing equipment is designed to uniformly extrude thin outer layers.

Where desired, the multilayer film composition of this invention may contain at least one colorant selected from a pigment or dye to provide a suitable color such as green or black to one or more film layers as commonly employed in trash bags.

It has been found that a multilayered, coextruded film comprising the low melt index, low pressure, low density polyethylene resins of this invention as the core layer, and high melt index, low pressure, low density polyethylene as the outer layers of the co-extruded film results in a superior, stronger film and packaging bag.

The multilayered structure having high melt index, low pressure, low density polyethylene as the outer layers is particularly desirable in order to gain freedom from melt fracture of the core layer at high output rates and at low process melt temperatures.

Illustrative, non-limiting examples of the features and practice of the invention are set out below. The parts and percentages set forth herein refer to parts by weight and percentages by weight, respectively, unless specifically stated otherwise.

In the following examples, the sample multilayer films were formed by co-extrusion of the film layers through a tubular die.

The multilayer film compositions were prepared by extruding the outer layers through each of two separate 1½ inch extruders while the core layer was extruded through a 3½ inch extruder. The multilayer die used to form the extruded bubble was a 12 inch three layer spiral manifold die having a 30 mil lip gap. The extruded film flatwidth was 36 inches. The layer thickness ratio of first outer layer to core layer to second outer layer was 1:5:1, respectively, in the samples prepared.

EXAMPLE I

A control multilayer film composition was prepared employing the aforedescribed extrusion apparatus. The material employed for the first and second outer layers and the core layer was low pressure, low density polyethylene having a melt index of about 1.0 decigrams per minute and a density of about 0.918 grams/cm$^3$. The extrusion melt temperatures for the first outer layer and the core layer were about 365° F. and 375° F., respectively, and the die temperature was about 350° F. The total extrusion rate was about 166 pounds per hour, and the total film thickness was about 1.5 mils.

The comparative evaluation results of this extruded mulilayer film are summarized in Table 1 and discussed pursuant thereto.

EXAMPLE II

A multilayer film composition was prepared employing the aforedescribed apparatus. The material employed for the first and second outer layers was a blended mixture comprising about 75 percent by weight of a low pressure, low density polyethylene having a melt index of about 3.0 decigrams per minute and a density of about 0.920 grams/cm$^3$ and about 25 percent by weight of a low pressure low density polyethylene having a melt index of about 17.0 decigrams per minute and a density of about 0.928 grams/cm$^3$. The blended mixture has a melt index of approximately 5.0 decigrams per minute. The material employed for the core layer was the same as in Example 1, i.e., low pressure, low density polyethylene having a melt index of about 1.0 decigrams per minute and a density of about 0.918 grams/cm$^3$. The extrusion melt temperatures for the first outer layer, core layer, and the second outer layer were about 345° F., 375° F., and 372° F., respectively, and the die temperature was about 350° F. The total extrusion rate and layer thickness were approximately the same as in Example I. The comparative evaluation results of this extruded multilayer film are summarized in Table 1 and discussed pursuant thereto.

TABLE 1
POWER REQUIREMENTS AND PROPERTIES

|  | Example I | Example II |
|---|---|---|
| Extruder Power Required (Amps.) | | |
| First Outer Layer | 29 | 16 |
| Core Layer | 117 | 113 |
| Second Outer Layer | 66 | 42 |
| Puncture Toughness | | |
| Load (lb/mil) | 3.2 | 4.2 |
| Energy (in-lb/mil) | 5.9 | 8.7 |
| Elmendorf Tear Strength (gms/mil) | | |
| Machine direction | 94 | 93 |
| Transverse direction | 317 | 447 |
| Tensile Strength (psi) | | |
| Machine direction | 3380 | 3840 |
| Transverse direction | 3420 | 4450 |
| Yield Strength (psi) | | |
| Machine direction | 1050 | 1480 |
| Transverse direction | 948 | 1420 |
| Melt Fracture | Severe | None |

The following test criteria were used in determining the results reported in Table 1.

Tensile strength was measured by ASTM D 882 Method A.

Elmendorf tear strength was measured by ASTM D1992.

Puncture toughness is a test originated to evaluate the relative resistance of a film to being punctured. There is no ASTM standard. Basically, a ¾ inch round steel plunger is pushed through a clamped film specimen at a speed of 20 inches per minute using a modified Instron Tester. The load to puncture the film specimen is recorded in pounds (lbs) per mil and the energy to puncture is the integrated area under the load-elongation curve and is recorded in inch-pounds (inch-lbs) per mil.

Melt index was determined by ASTM D-1238-Condition E-measured at 190° C. and reported as grams per 10 minutes.

Examination of the data in Table 1 shows that a multilayer film composition containing a core layer of a low melt index, low pressure, low density polyethylene and two outer layers comprising a high melt index, low pressure, low density polyethylene (example II) has superior and improved physical properties over such a multilayer film composition containing a low melt index, low pressure, low density polyethylene as the two outer layers (example I). More specifically, a multilayer film composition containing a low melt index, low pressure, low density polyethylene as the core layer and a high melt index, low pressure, low density polyethylene as two outer layers has improved puncture toughness, transverse direction Elmendorf tear strength, machine direction and transverse direction yield and tensile strengths without sacrifice in machine direction tear strength compared to such a multilayer film composition wherein a low melt index, low pressure, low density polyethylene is present in the two outer layers. In addition, the multilayer film composition containing a high melt index, low pressure, low density polyethylene as the two outer layers requires less extruder energy and experiences no melt fracture events compared to a multilayer film composition wherein a low melt index, low pressure, low density polyethylene is present in the two outer layers. Further, the film composition containing the high melt index, low pressure, low density polyethylene in the two outer layers has a smooth and glossy surface.

It should also be apparent to one skilled in the art to employ the process and multilayer film composition of this invention to make other articles of manufacture such as electric conduit coverings, water pipes, and sewer pipes.

Although illustrative embodiments of this invention have been described in detail, it is contemplated that modifications thereof may be made and that some features may be employed without others, all within the spirit and scope of the invention. For example, although the films described in the foregoing examples were prepared by bubble extrusion, other preparative methods may be used as, for example, slot cast extrusion, or blow molding.

We claim:

1. A multilayer film free of melt fracture comprising a core layer of low melt index, low pressure, low density polyethylene between two outer layers of a high melt index, low pressure, low density polyethylene said low melt index polyethylene having a melt index of between about 0.2 decigrams per minute and about 3.0 decigrams per minute, and said high melt index polyethylene having a melt index of greater than about 3.0 decigrams per minute.

2. A multilayer film as in claim 1 wherein said core layer of said polyethylene has a melt index of between about 0.2 and about 2.0 decigrams per minute.

3. A multilayer film as in claim 1 wherein said outer layers of said polyethylene have a melt index of between about 5.0 decigrams per minute and about 20.0 decigrams per minute.

4. A multilayer film as in claim 1 wherein the thickness of said film is between about 1 mil and about 3 mils.

5. A multilayer film as in claim 4 wherein the thickness of said film is between about 1.3 and about 1.8 mils.

6. A multilayer film as in claim 1 wherein the ratio of thicknesses between said core layer and said two outer layers is on the order of about 1:5:1.

7. A multilayer film as in claim 1 wherein said film contains at least one colorant.

8. A multilayer film as in claim 1 wherein said film is formed into a bag.

* * * * *